(12) United States Patent
Dunsbergen et al.

(10) Patent No.: US 11,457,099 B2
(45) Date of Patent: Sep. 27, 2022

(54) INTEGRATED LOCAL AREA NETWORKS (LANS) AND PERSONAL AREA NETWORKS (PANS)

(71) Applicant: Hewlett Packard Enterprise Development LP, Houston, TX (US)

(72) Inventors: Berend Dunsbergen, Santa Clara, CA (US); Peter Charles Mytton Thornycroft, Santa Clara, CA (US); Jian Dong, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 162 days.

(21) Appl. No.: 16/684,525

(22) Filed: Nov. 14, 2019

(65) Prior Publication Data

US 2021/0152677 A1 May 20, 2021

(51) Int. Cl.
*H04L 69/323* (2022.01)
*H04L 69/08* (2022.01)
*H04L 69/16* (2022.01)
*H04W 4/80* (2018.01)

(52) U.S. Cl.
CPC ......... *H04L 69/323* (2013.01); *H04L 69/08* (2013.01); *H04L 69/161* (2013.01); *H04W 4/80* (2018.02)

(58) Field of Classification Search
CPC ....................................................... H04L 69/08
See application file for complete search history.

(56) References Cited

U.S. PATENT DOCUMENTS

| | | | | |
|---|---|---|---|---|
| 2007/0110080 | A1* | 5/2007 | Bennett | H04L 45/22 370/400 |
| 2008/0240037 | A1* | 10/2008 | Bedekar | H04W 92/02 370/331 |
| 2008/0291870 | A1* | 11/2008 | Chen | H04W 88/02 370/328 |
| 2013/0003719 | A1* | 1/2013 | Kamdar | H04M 3/5116 370/352 |
| 2017/0230888 | A1* | 8/2017 | Fulknier | H04W 40/00 |
| 2018/0336420 | A1* | 11/2018 | Pandharipande | G06F 21/6245 |

* cited by examiner

*Primary Examiner* — Nicholas R Taylor
*Assistant Examiner* — Sm Z Islam
(74) *Attorney, Agent, or Firm* — Jaffery Watson Mendonsa & Hamilton

(57) ABSTRACT

Architectures and techniques for hybrid network communications. Data is received from a remote end device via a first wireless interface and according to a first communications protocol. Data is received from a remote client device via a second wireless interface and according to a second communications protocol. At least a portion of the data from the remote end device is translated to a data format according to a first network protocol. Transmitting the translated data to a network coordinator entity via a wired interface and according to the second communications protocol.

14 Claims, 11 Drawing Sheets

INTEGRATED LOCAL AREA NETWORKS (LANS) AND PERSONAL AREA NETWORKS (PANS)

TECHNICAL FIELD

Embodiments relate to techniques for integrating multiple types of wireless networks to provide a more efficient environment. More particularly, embodiments relate to techniques for integrating local area network and personal area network hardware and supporting mechanisms to provide an efficient and streamlined network.

BACKGROUND

Local area networks (LANs) are very common for interconnecting various electronic devices, for example, computers, phones, tablets, televisions. Enterprise LANs are utilized to connect a large number of electronic devices over a relatively large physical area.

Personal area networks (PANs), in contrast, utilize lower powered radios to connect a smaller number of devices (e.g., two) over a relatively small physical area. Each network type has its advantages and disadvantages. PAN protocols include, for example, Bluetooth, Zigbee, Z-Wave, RuBee, etc.

Because these different types of networks provide advantages for different types of devices, they are often deployed in parallel. For example, in a corporate setting, an enterprise LAN may be deployed to support computers, phones, tablets and similar devices, while one Zigbee network may be deployed to support door locks and another Zigbee network may be deployed to support heating, air conditioning and ventilation (HVAC) functionality.

This type of deployment of multiple parallel networks can result in many inefficiencies and/or conflicts.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

The examples provided below are generally in terms of IEEE 802.11 based local area networks (LANs) and IEEE 802.15 based personal area networks (PANs); however, the architectures and techniques can be applied to other LAN-PAN combinations.

In general, LANs include one or more access points (APs) that connection one or more wireless stations (STAs) to a wired network. In enterprise settings, LANs can include additional components such as edge switches and network controllers. In general, a Zigbee network includes multiple nodes that communicate with each other wirelessly.

Described herein are wireless networks in which PAN radios are embedded in LAN network components. In these types of hybrid wireless networks, traditional network architectures and topologies are not optimal. For the examples that follow, the PAN functionality of the hybrid wireless networks are provided in terms of Zigbee terminology; however, other PAN protocols can also be supported in similar architectures and techniques.

A Zigbee network is a wireless mesh network having three types of network elements. A coordinator is responsible for starting the network and for other centralized network functions. There is one coordinator per PAN. Routers connect to the coordinator and to other routers to form a network. End devices can connect to a router or to the coordinator. End devices are typically low-power devices that utilize a sleep mode with not in use.

Figure 1:
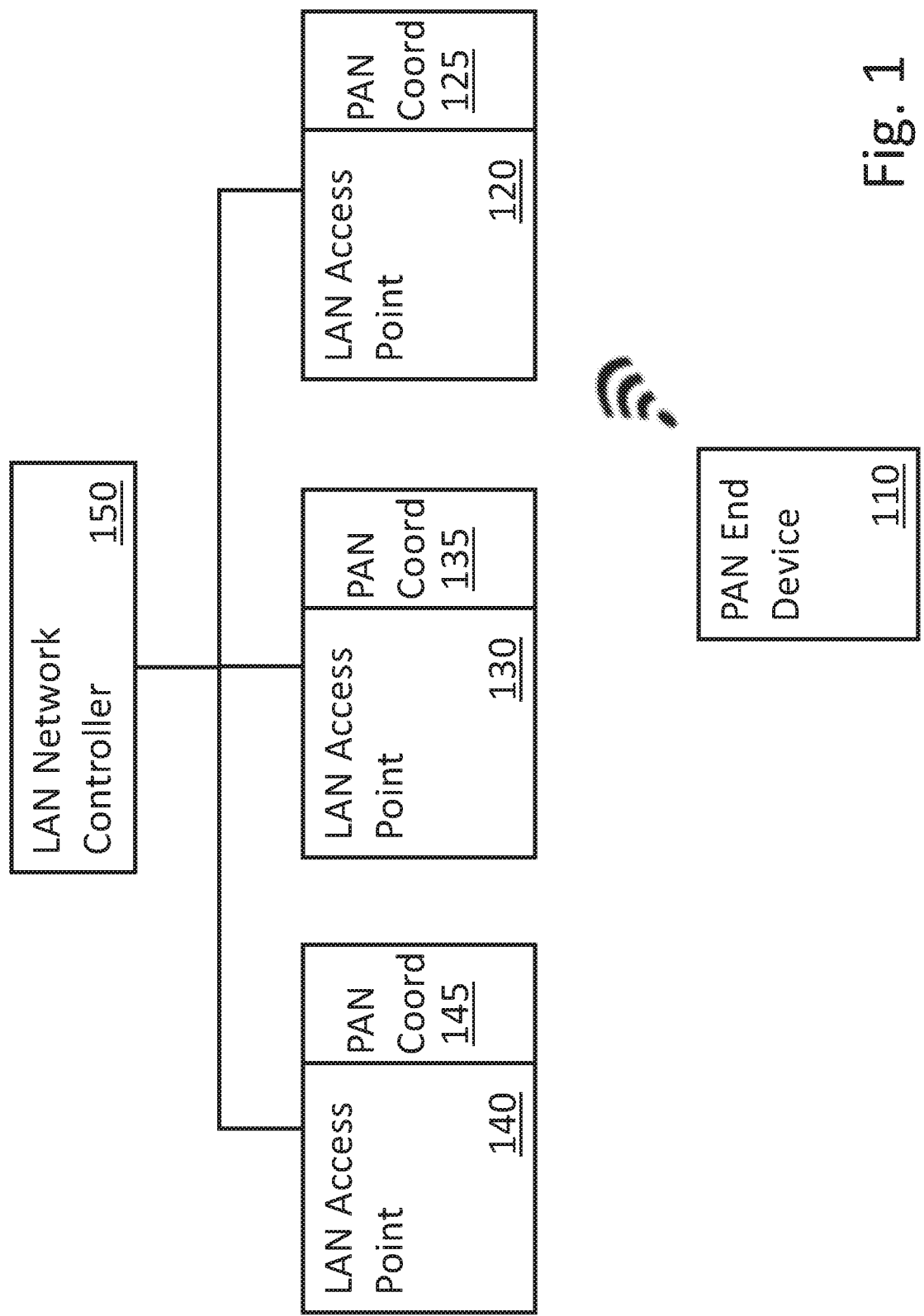
FIG. 1 is a first embodiment of an example hybrid LAN-PAN architecture.

FIG. 1 is a first embodiment of an example hybrid LAN-PAN architecture. In the example of FIG. 1, PAN (e.g., Zigbee) radios are integrated into LAN hardware. The example of FIG. 1 is a simple configuration in which each LAN access point functions as a coordinator.

In the example of FIG. 1, PAN end device can communicate wirelessly with PAN coordinator 125 provided by LAN access point 120. Traffic between PAN coordinator 125 and any external devices (not illustrated in FIG. 1) can be transmitted via wired connection between LAN access point 120 and LAN controller 150. Any number of PAN end devices can be supported in this manner.

PAN coordinators 135 and 145 are provided by LAN access points 130 and 140, respectively. Additional PAN end devices (not illustrated in FIG. 1) can communicate with PAN coordinators 135 and 145 as described with respect to PAN end device 110, PAN coordinator 125, LAN access point 120 and LAN controller 150.

Thus, in the example of FIG. 1, traffic flows from PAN end devices to LAN access points having PAN radios and providing PAN functionality, where the LAN access points implement the PAN coordinators. The PAN coordinators can then forward traffic to appropriate applications. Techniques for forwarding traffic are described in greater detail below.

While the hybrid wireless network topology of FIG. 1 is a relatively simple network topology, there are some shortcomings. For example, because every LAN access point provides a separate PAN network, PAN end devices are unable to roam between LAN access points. If one LAN access point fails, its PAN end devices would be unable to connect to another LAN access point as a fallback.

Figure 2:
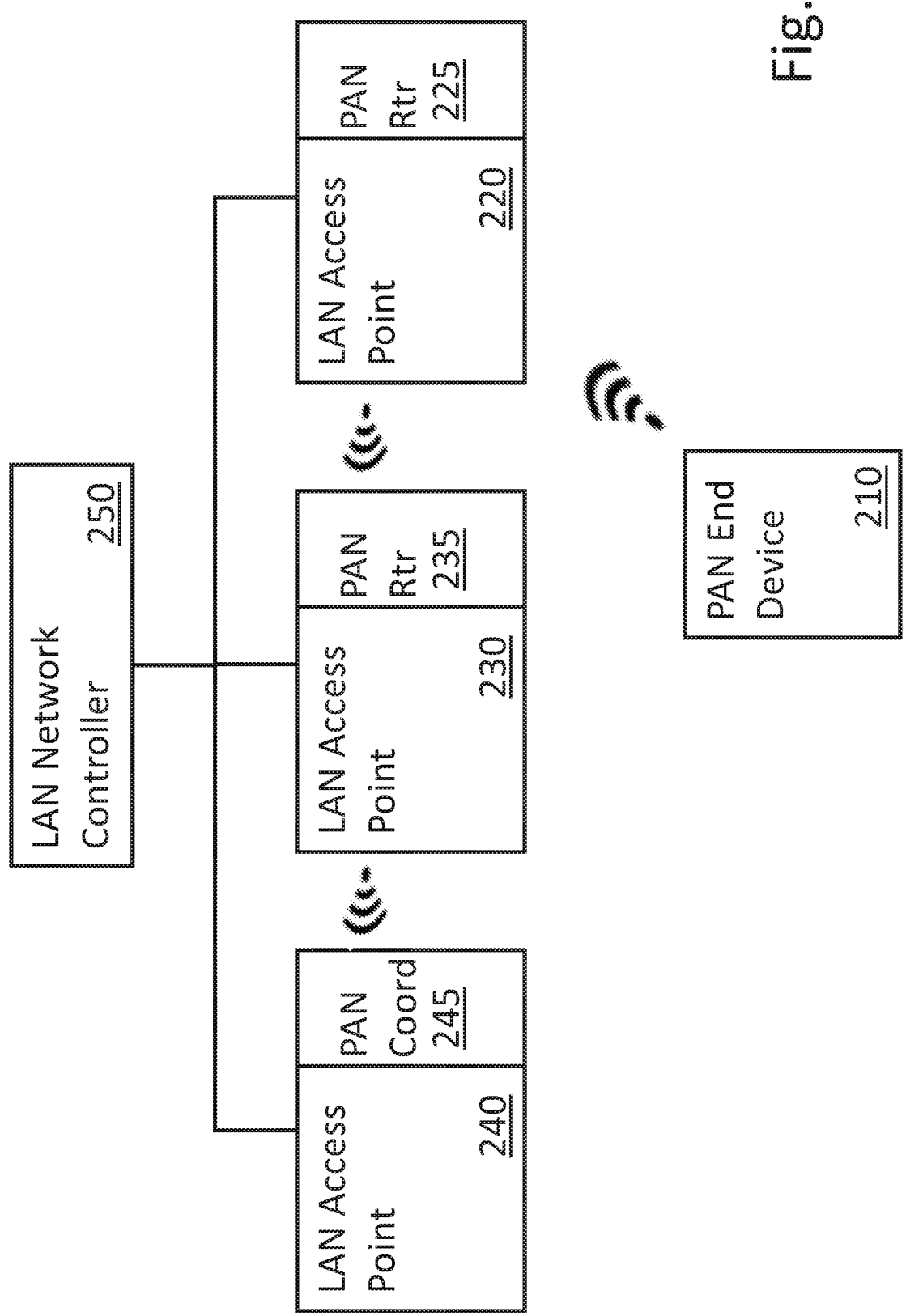
FIG. 2 is a second embodiment of an example hybrid LAN-PAN architecture.

FIG. 2 is a second embodiment of an example hybrid LAN-PAN architecture. In the example of FIG. 2, one LAN access point operates as a PAN coordinator and the other LAN access points function as PAN routers.

In the example of FIG. 2, PAN end device 210 communicates with the nearest PAN router (e.g., 225, 235) provided by a LAN access point (e.g., 220, 230) having a PAN radio and providing PAN functionality. The PAN router receiving the traffic (e.g., 225) can forward the traffic to one or more other PAN routers (e.g., 235) in the process of sending the traffic to the PAN coordinator (e.g., 245 in access point 240). The traffic can then be forwarded over a wired connection to network controller 250 to, for example, an application (not illustrated in FIG. 2).

In this topology, the network can provide support for roaming and failover. However, this topology also has some shortcomings. The hybrid LAN-PAN wireless network as illustrated in FIG. 2 requires additional over-the-air traffic as compared to the network of FIG. 1. In the example of FIG. 2, each PAN frame is transmitted over the air one or more times to reach the LAN access point providing the PAN coordinator functionality. Another shortcoming is that all nodes use the same channel, which makes avoiding interference difficult.

Figure 3:
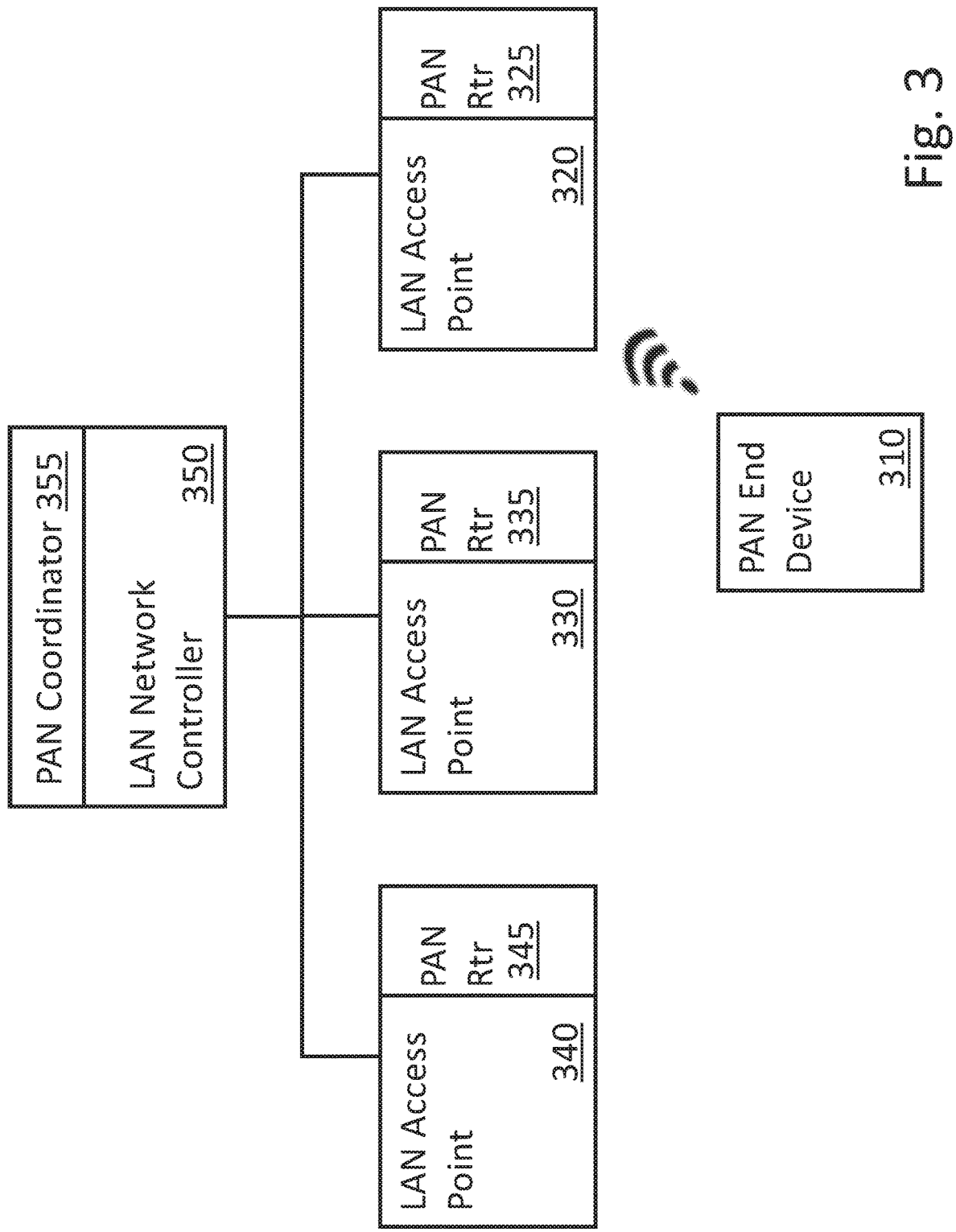
FIG. 3 is a third embodiment of an example hybrid LAN-PAN architecture.

FIG. 3 is a third embodiment of an example hybrid LAN-PAN architecture. In the example of FIG. 3, each LAN access point (e.g., 320, 330, 340) provides a PAN router (e.g., 325, 335, 345) and PAN end device 310 can communicate with any of the LAN access points providing PAN functionality.

In the example of FIG. 3, PAN coordinator 355 is provided by LAN controller 350. In alternate embodiments, PAN coordinator 355 can be provided by another LAN node (e.g., an access point, a separate component, a remote cloud environment). In the example of FIG. 3, communication between the PAN router communicating with the PAN end device is over a wired connection, for example, tunneled over an Internet Protocol (IP) network. Thus, the over-the-air PAN router traffic can be eliminated.

As discussed in greater detail below, the hybrid LAN-PAN wireless network topologies described with respect to FIGS. 1-3 can provide an improved network architecture by deploying the PAN coordinator in the back end of the network. In the embodiments described, the coordinator-router link is not a wireless link according to the PAN protocol, but is a wired connection supported by a hybrid stack, embodiments of which are described in greater detail below. In alternate embodiments, the coordinator-router link can be a wireless link that does not comply with the relevant PAN protocol.

Continuing with the Zigbee PAN example, the full Zigbee stack includes several layers. The upper layers are defined by the Zigbee protocols and the Media Access Control (MAC) and physical (PHY) layers are defined by IEEE 802.15.4. In the following examples one or more of the lower layers of the Zigbee stack that are defined by IEEE 802.15.4 can be replaced by a different transport.

Figure 4:
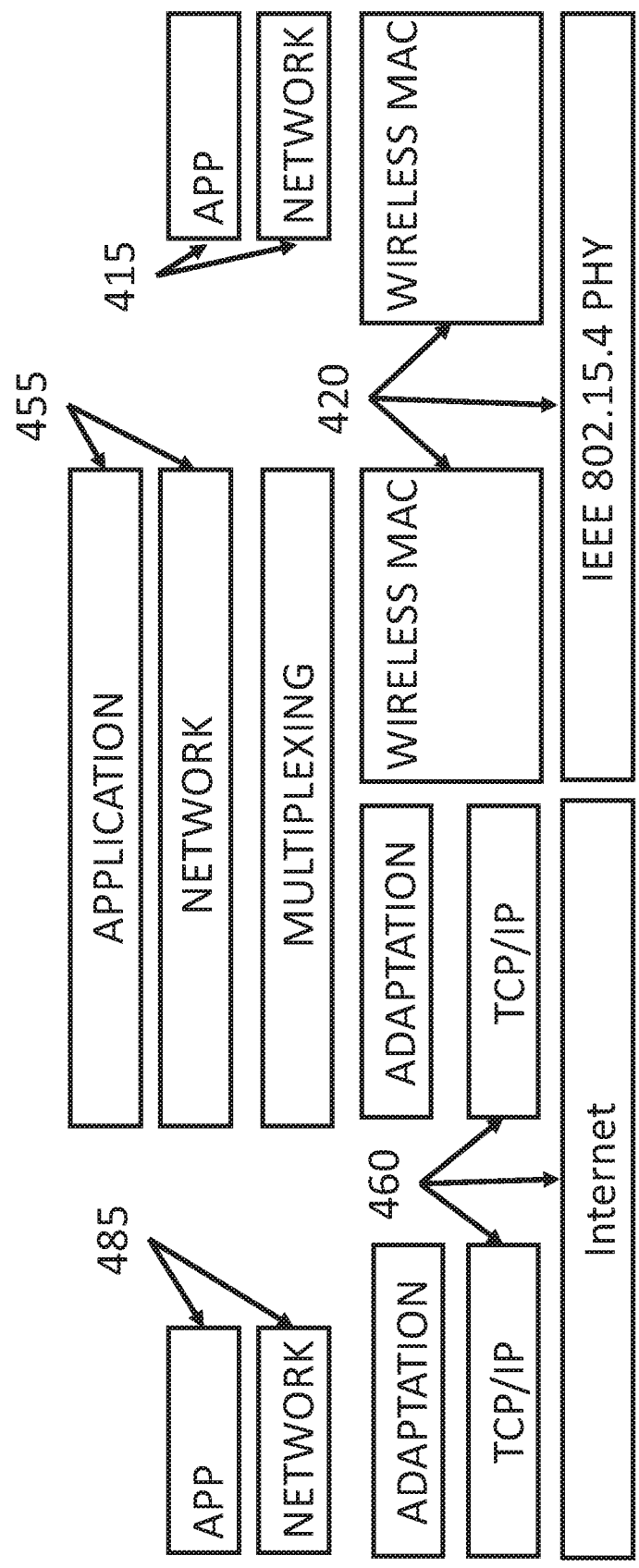
FIG. 4 illustrates one embodiment of a network stack to support a hybrid LAN-PAN wireless network as described herein.

FIG. 4 illustrates one embodiment of a network stack to support a hybrid LAN-PAN wireless network as described herein. The hybrid stack embodiments described with respect to FIGS. 4 and 5 can be utilized to support the topology of FIG. 3.

In the example of FIG. 4, the bottom two layers of the stack that are traditionally defined by IEEE 802.15.4 are replaced by a different transport. In the example of FIG. 4, the connection between the PAN coordinator and the PAN router is Transmission Control Protocol/Internet Protocol (TCP/IP) rather than an IEEE 802.15.4 wireless link.

In one embodiment, PAN end device 410 utilizes standard PAN application layer and network layer functionality, 415. In one embodiment, PAN end device 410 can utilize IEEE 802.15.4 MAC layer and PHY layer functionality to communicate with PAN router 450. This could be utilized, for example, between PAN end device 310 and LAN access point 320 providing PAN router 325 in the architecture of FIG. 3. Thus, in one embodiment, communication between PAN end device 410 and PAN router 450 occurs according to standard PAN (e.g., Zigbee) protocols.

In one embodiment, PAN router 450 utilizes standard PAN application layer and network layer functionality, 455. In one embodiment, PAN router 450 can provide a multiplexing layer between the network layer and the lower layers.

In one embodiment, PAN router 450 can utilize a wired communications link to PAN coordinator 480 and can utilize a different (e.g., not standard PAN protocols, not IEEE 802.15.4 MAC layer and PHY layer functionality) to communicate with PAN coordinator 480. In one embodiment, TCP/IP can be utilized. Techniques to support this hybrid stack architecture are described in greater detail below.

This could be utilized, for example, between PAN router 325 provided by LAN access point 320 and PAN coordinator 355 provided by LAN controller 350 in the architecture of FIG. 3. Thus, in one embodiment, communication between PAN router 325 and PAN controller 355 carries PAN data, but does not occur according to standard PAN (e.g., Zigbee) protocols.

Figure 5:
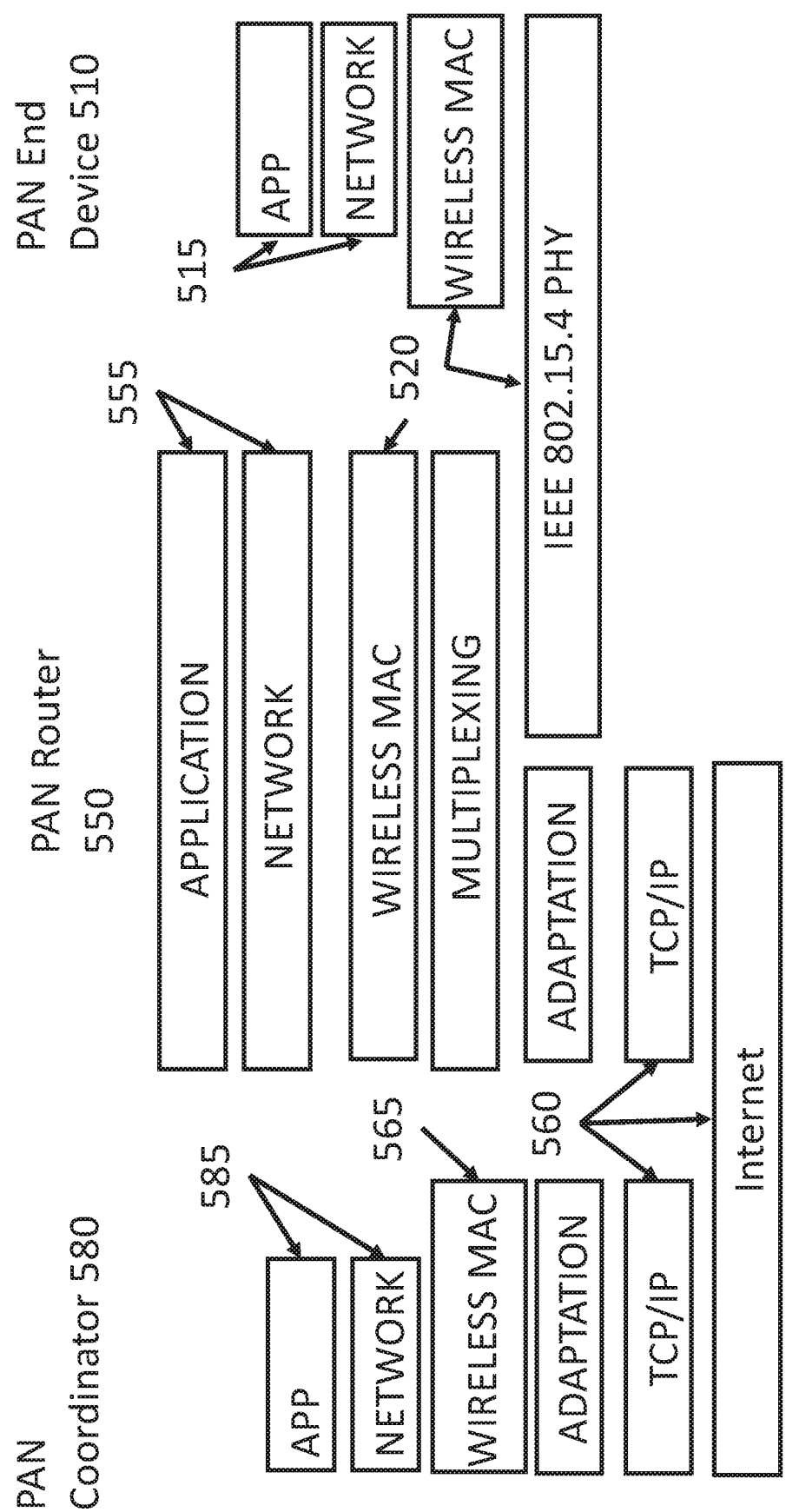
FIG. 5 illustrates one embodiment of a network stack to support a hybrid LAN-PAN wireless network as described herein.

FIG. 5 illustrates one embodiment of a network stack to support a hybrid LAN-PAN wireless network as described herein. In the example of FIG. 5, the PHY layer is replaced by a different transport.

In one embodiment, PAN end device 510 utilizes standard PAN application layer and network layer functionality, 515. In one embodiment, PAN end device 510 can utilize IEEE 802.15.4 MAC layer and PHY layer functionality to communicate with PAN router 550. This could be utilized, for example, between PAN end device 310 and LAN access point 320 providing PAN router 325 in the architecture of FIG. 3. Thus, in one embodiment, communication between PAN end device 410 and PAN router 450 occurs according to standard PAN (e.g., Zigbee) protocols.

In one embodiment, PAN router 550 utilizes standard PAN application layer and network layer functionality, 555. In one embodiment, PAN router 550 can provide a multiplexing layer between the MAC layer and the PHY layer.

In one embodiment, PAN router 550 can utilize a wired communications link to PAN coordinator 580 and can utilize a different (e.g., not standard PAN protocols, not IEEE 802.15.4 MAC layer and PHY layer functionality) to communicate with PAN coordinator 580. In one embodiment, TCP/IP can be utilized. Techniques to support this hybrid stack architecture are described in greater detail below.

This could be utilized, for example, between PAN router 325 provided by LAN access point 320 and PAN coordinator 355 provided by LAN controller 350 in the architecture of FIG. 3. Thus, in one embodiment, communication between PAN router 325 and PAN controller 355 carries PAN data, but does not occur according to standard PAN (e.g., Zigbee) protocols.

In a traditional Zigbee network, all nodes operate on the same channel. This is required because PAN routers must simultaneously listen to traffic from child nodes and from parent nodes. In a network where each LAN access point is a PAN router and the PAN coordinator is deployed in the back end of the network, there is no need for all PAN routers to be on the same channel. Thus, in the hybrid wireless networks described herein each LAN access point providing a PAN router can locally select a channel that is best suited for the local conditions. For example, a PAN router can select the channel that causes the least interference with the local 2.4 GHz Wi-Fi radio.

Another benefit of deploying the PAN coordinator in the back end of the network is that it may be provided by a device that has fewer constraints (e.g., processor, memory) than other network nodes, for example, access points.

Figure 6:
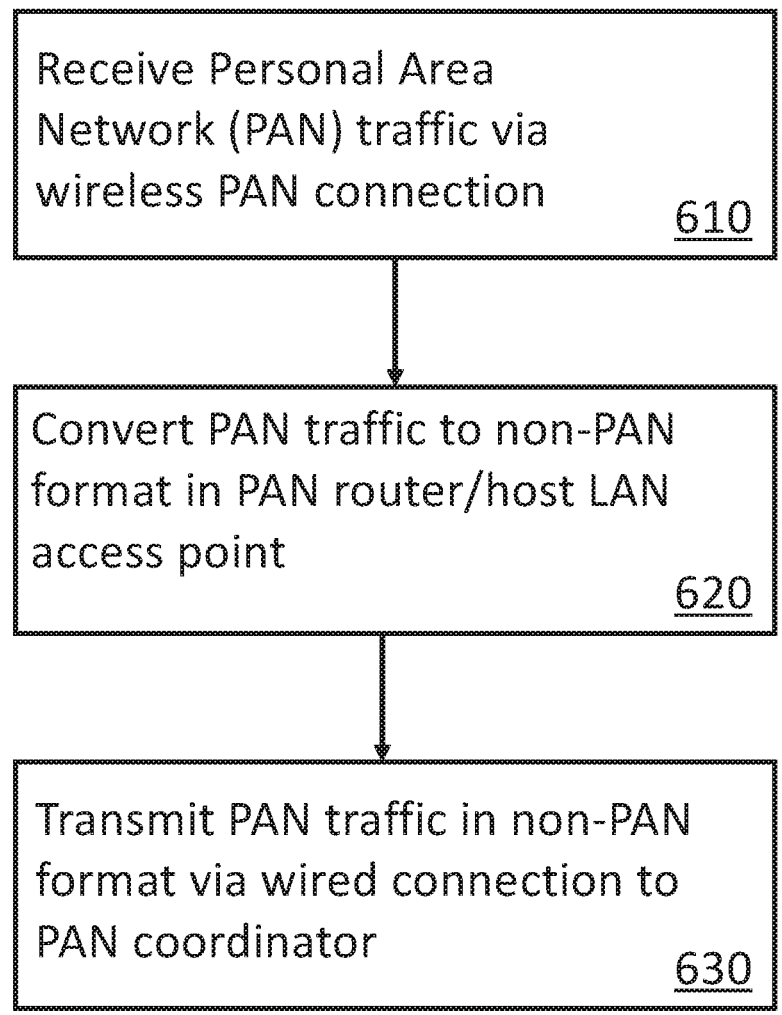
FIG. 6 is one embodiment of a flow diagram for a PAN router managing traffic in a hybrid wireless network.

FIG. 6 is one embodiment of a flow diagram for a PAN router managing traffic in a hybrid wireless network. In the example of FIG. 6, the PAN router operating as described can be part of a LAN access point, for example, PAN router 325 provided by LAN access point 320 in FIG. 3.

The PAN router can receive PAN traffic via a wireless PAN connection, 610. For example, in a Zigbee embodiment, the PAN router can receive data according to the relevant PAN protocol from a PAN end device. As discussed above, other PAN protocols can also be supported. The traffic is received via the PAN radio utilizing the PAN protocols.

The PAN router can convert the received PAN traffic to a non-PAN format, 620. In one embodiment, the PAN router can perform the conversion. In alternate embodiments, the host LAN access point can perform the conversion. In one embodiment, the conversion of PAN traffic to non-PAN format involves wrapping the PAN packet in a non-PAN packet. For example, a Zigbee packet can be wrapped in a TCP/IP packet for transmission from the PAN router/host LAN access point.

The converted/wrapped PAN traffic is transmitted to the PAN coordinator over a wired connection, 630. In one embodiment, the converted/wrapped PAN traffic is transmitted from the host LAN access point over a wired connection to the LAN node (e.g., network controller) hosting the PAN coordinator. The transmission can be accomplished using, for example TCI/IP, or any other suitable protocol. In some embodiments the PAN router utilizes one of the hybrid network stacks discussed above.

Various advantageous uses of VPANs are described in greater detail below. For example, multiple VPANs per LAN AP and/or one VPAN per end device. The VPAN uses described below can be utilized with or without the hybrid architectures described above.

Figure 7:
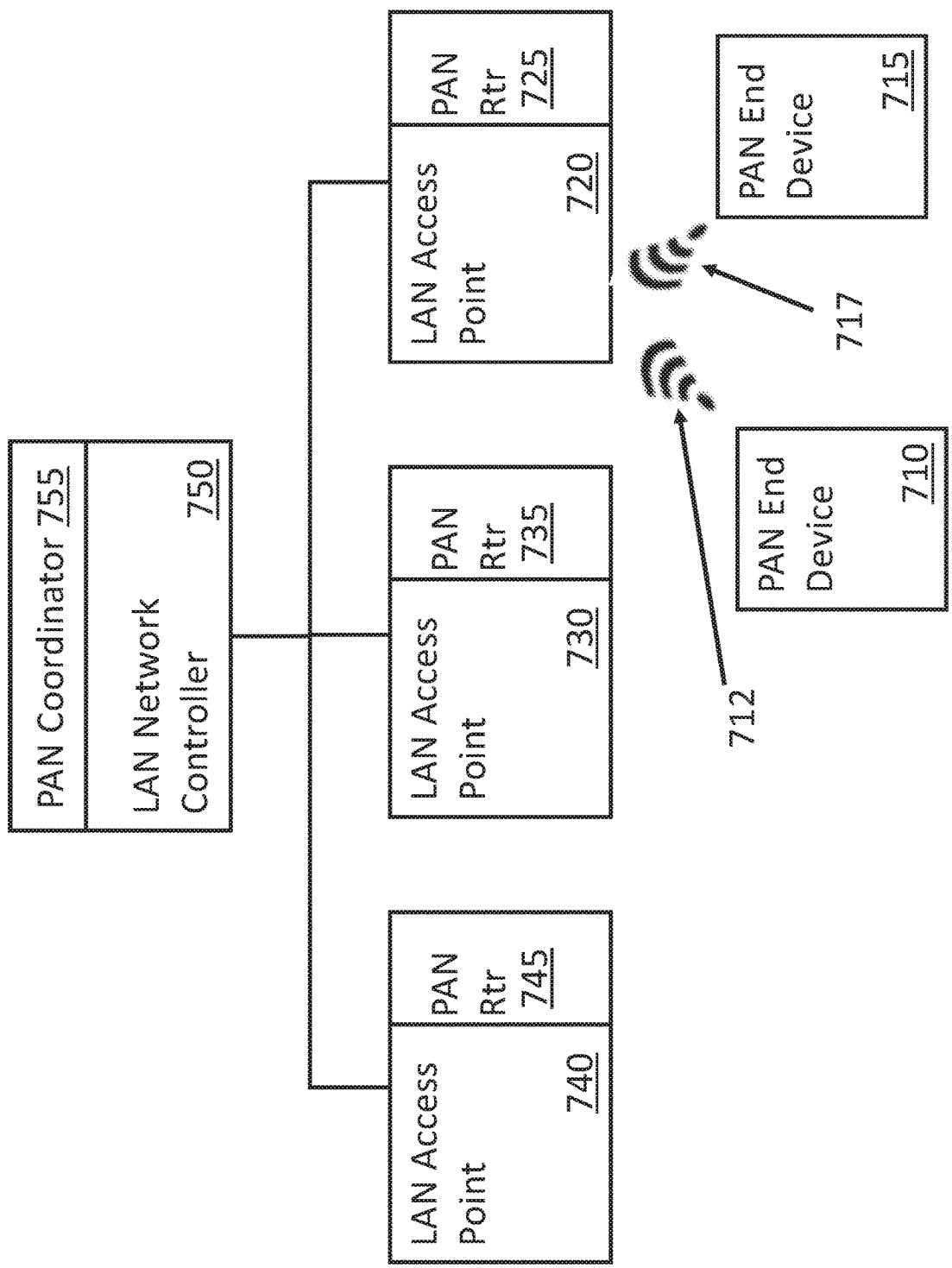
FIG. 7 is one embodiment of an example hybrid LAN-PAN architecture that can provide multiple virtual PANs.

FIG. 7 is one embodiment of an example hybrid LAN-PAN architecture that can provide multiple virtual PANs. The example of FIG. 7 is based on the network example of FIG. 3; however, multiple virtual PANs can be provided with the networks of FIGS. 1 and 2 as well.

The PAN (e.g., a Zigbee network) can be identified by its PANID. In one embodiment, this is a unique number that is chosen when the network starts. When a PAN end device scans for available networks, nearby PAN routers and/or PAN coordinators can respond with their PANIDs to identify available networks.

In one embodiment, in response to a PAN end device scan request, one or more PAN routers and/or PAN coordinators can provide multiple separate responses with different PAN-IDs. The PAN end device can then connect with the appropriate VPAN.

In the example of FIG. 7, each LAN access point (e.g., 720, 730, 740) provides a PAN router (e.g., 725, 735, 745), each of which can support one or more VPANs.

In the example of FIG. 7, PAN coordinator 355 is provided by LAN controller 350. In the example of FIG. 7, communication between the PAN router communicating with the PAN end device is over a wired connection, for example, tunneled over an Internet Protocol (IP) network.

The example of FIG. 7 illustrates two VPANs; however, any number of VPANs can be supported. For example, PAN end device 710 can connect to PAN router 725 via VPAN 712 and PAN end device 715 can connect to PAN router 725 via VPAN 717.

Use of multiple VPANs in a single physical network can allow VPANs with different security levels on the same network. This is not possible with current network configurations. In a Zigbee PAN, for example, the network security level is defined at the network level. This means that all PAN end devices connect at the same security level. With VPANs, the security level can be different for each VPAN. This could allow, for example, a secure network and an unsecure network within the same physical network.

Use of multiple VPANs can also provide a more secure method for new PAN end devices to join the network. In Zigbee, end devices can only join a network when the permit-join parameter is set to true. This is a network-wide parameter. Making the permit-join parameter part of the VPAN allows greater control over which networks are open to adding new end devices and which networks are closed.

In one embodiment, a single (or small subset) of VPANs can be used for initial network association. A building or enterprise could, for example, specify a particular channel and PANID (and network security key) for all new end devices. This simplifies pre-configuration of end devices before deployment, as they can all be given a common configuration. After the end devices have been activated, they can be subject to security checks on the deployment/quarantine PAN before being reconfigured (e.g., through the network) to a new channel and PANID for operation.

Figure 8:
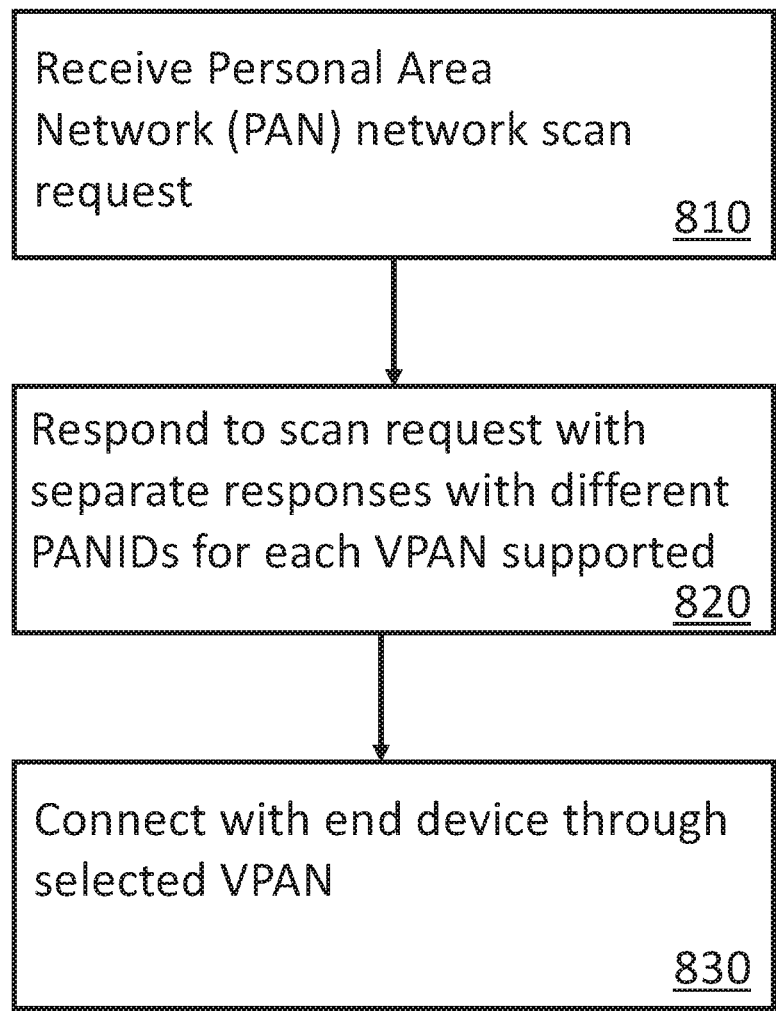
FIG. 8 is a flow diagram for one embodiment of a technique for providing multiple VPANs in a single physical network.

FIG. 8 is a flow diagram for one embodiment of a technique for providing multiple VPANs in a single physical network. In one embodiment, the technique of FIG. 8 can be performed by a PAN router that is provided by a LAN access point.

The PAN router can receive a network scan from a new end device, 810. This can be performed in any manner known in the art. In response to the network scan, the PAN router can reply with separate response messages each having a different PANID for each VPAN supported by the PAN router 820.

The different VPANs can have different network characteristics or parameters. For example, multiple VPANs can be utilized to support different security levels. As another example, different VPANs can have different permissions/settings for new devices joining the network. A VPAN can have a maximum number of supported devices and may not accept new devices once a threshold number of devices has been met.

Figure 9:
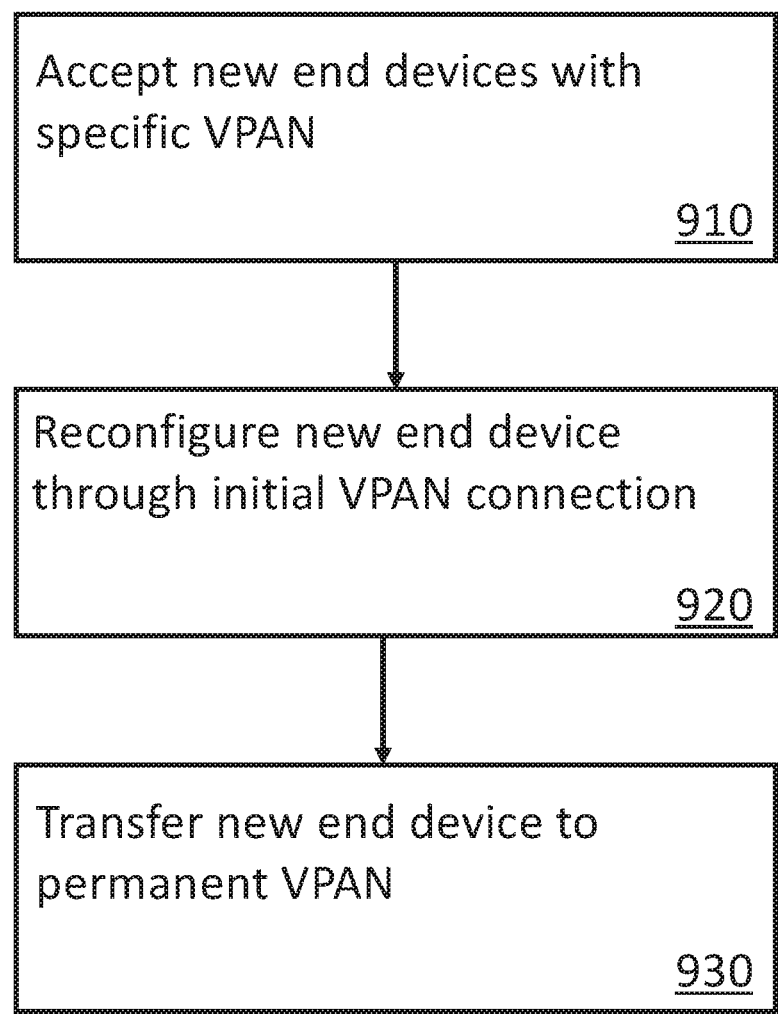
FIG. 9 is a flow diagram for one embodiment of a technique for providing multiple VPANs in a single physical network including a specified initial VPAN.

FIG. 9 is a flow diagram for one embodiment of a technique for providing multiple VPANs in a single physical network including a specified initial VPAN. As discussed above, a PAN router can support multiple VPANs. In one embodiment, the PAN router provides a single VPAN for new and/or suspicious end devices.

The PAN router can accept new end devices to a single VPAN (or alternatively a subset of available VPANs), 910. Once the new end device has been activated, it can be subject to security checks on the initial VPAN. If the new device fails the security checks it can be quarantined.

In one embodiment, the end devices can be pre-configured to access the initial VPAN. Once joined to the network, the new end device can be reconfigured through the initial VPAN, 920. The reconfigured end device can then be transferred to a permanent VPAN, 930.

Figure 10:
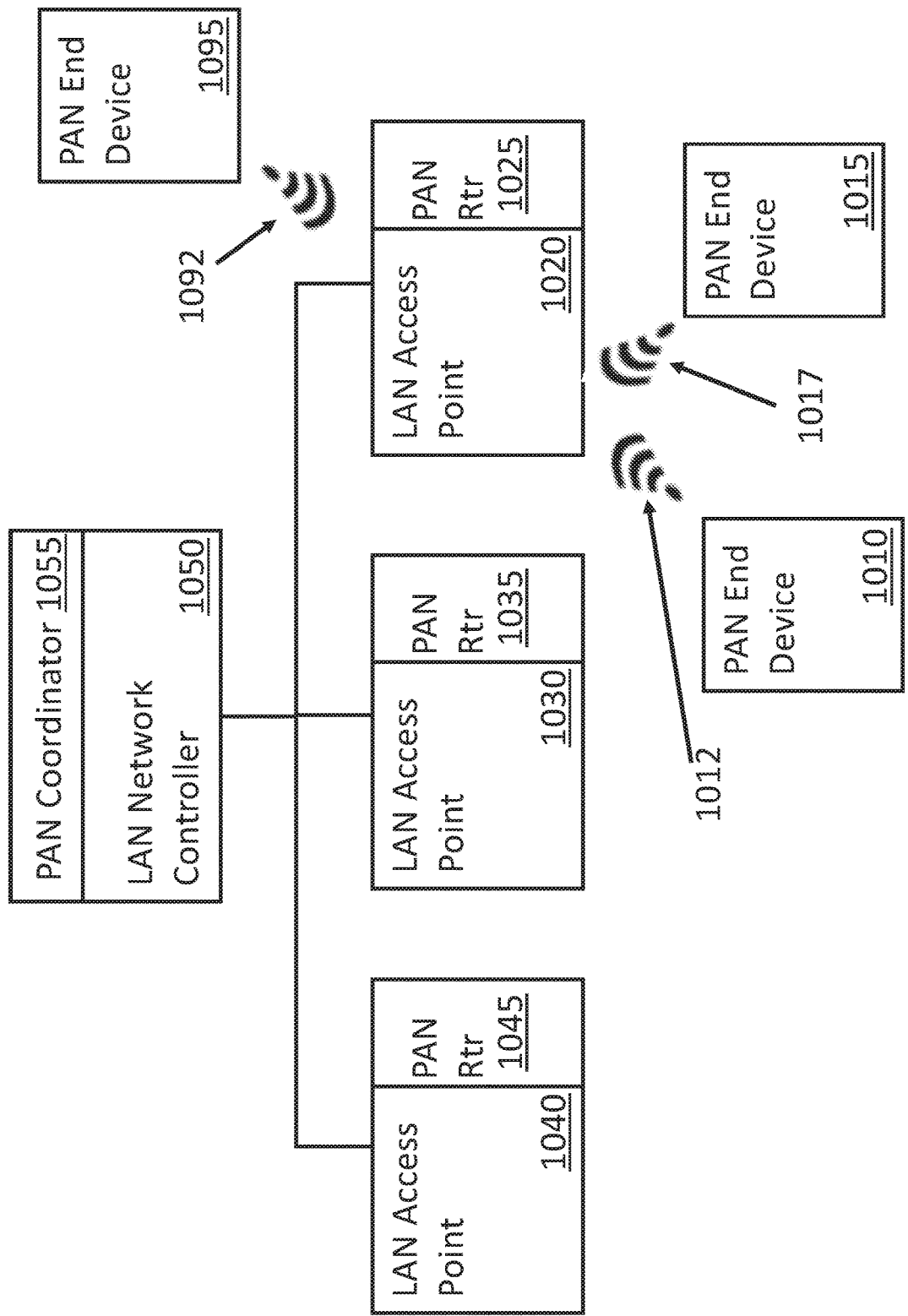
FIG. 10 is one embodiment of an example hybrid LAN-PAN architecture that can provide virtual PANs for each end device.

FIG. 10 is one embodiment of an example hybrid LAN-PAN architecture that can provide virtual PANs for each end device. The example of FIG. 10 is based on the network example of FIG. 3; however, multiple virtual PANs can be provided with the networks of FIGS. 1 and 2 as well.

In one embodiment, a VPAN can be provided for each end device. In one embodiment, when a new end device scans for networks, the nearby PAN routers can create a PANID on the fly and respond with the newly created PANID(s). In one embodiment, only the PAN router or PAN coordinator that serves the end device would advertise the client-specific PANID.

In the example of FIG. 10, each LAN access point (e.g., 1020, 1030, 1040) provides a PAN router (e.g., 1025, 1035, 1045), each of which can support one or more VPANs, one VPAN (e.g., 1012, 1017, 1092) for each end device (e.g., 1010, 1015, 1095). In the example of FIG. 10, PAN coordinator 1055 is provided by LAN controller 1050. In the example of FIG. 10, communication between the PAN router communicating with the PAN end device is over a wired connection, for example, tunneled over an Internet Protocol (IP) network.

The example of FIG. 10 illustrates three VPANs; however, any number of VPANs can be supported. In one embodiment, each of routers 1025, 1035 and 1045 can generate new PANIDs in response to network scans. Also, when an end device leaves a VPAN, the VPAN can be deleted. In some embodiments, end devices can roam between PAN routers and when the end device changes routers, the corresponding VPAN is transferred to the new router so that the VPAN roams with the corresponding end device.

Figure 11:
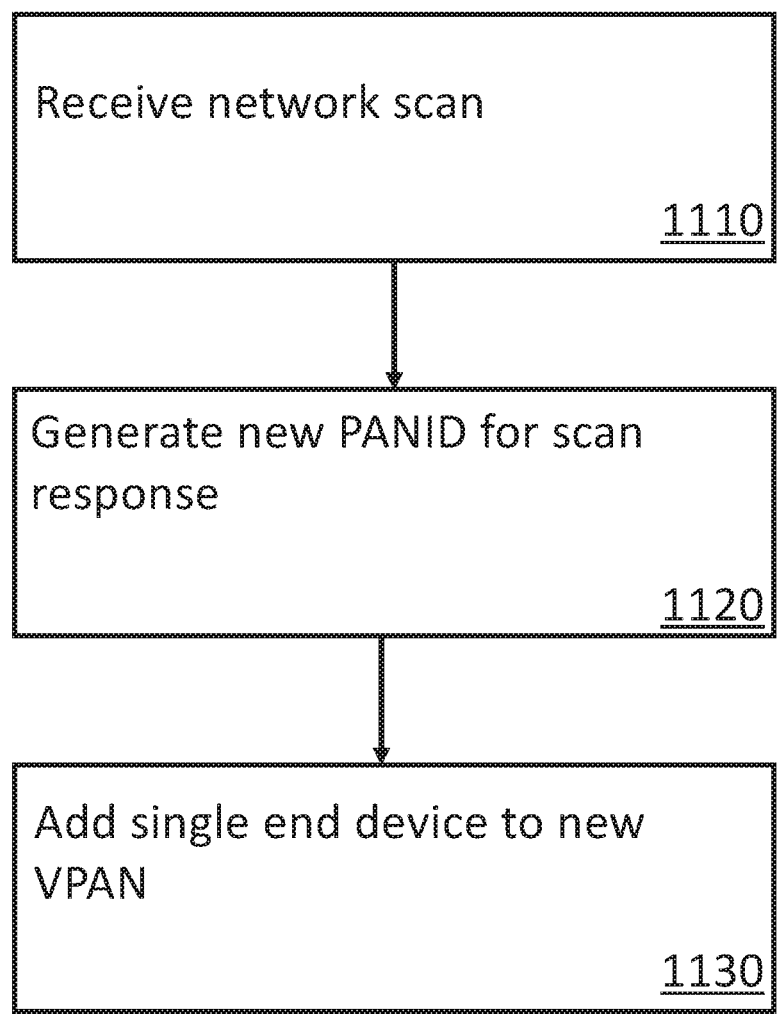
FIG. 11 is a flow diagram for one embodiment of a technique for providing multiple VPANs in a single physical network including a VPAN for each end device.

FIG. 11 is a flow diagram for one embodiment of a technique for providing multiple VPANs in a single physical network including a VPAN for each end device. In one embodiment each PAN router and PAN coordinator in a network functions to support individual VPANs for each end device.

A network scan request is received, 1110. In response to the request, the router/coordinator can generate a new PANID to respond to the requesting device, 1120. The selected router can then add the new end device to its own VPAN, 1130.

Utilizing a VPAN for each end device can provide several advantages over previous architectures. For example, access control can be more flexibly managed. The network can decide whether to respond to a scan request. If the requesting device is not allowed on the network, network devices may not respond.

Use of individual VPANs can be used to support infrastructure-initiated roaming. The network can cause a client to roam from one router to another by removing the client-specific VPAN from the first router and adding it to another router. Individual VPANs can be utilized to isolate and/or quarantine devices that are untrustworthy/suspicious/malicious/etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A wireless network comprising:
   a network controller having one or more wired interfaces to receive network traffic according to a first network protocol;
   at least one end device scanning for network access points to establish a wireless interface, wherein the wireless interface will be established between the at least one end device and one of the network access points if the network access point is within a connection range;
   the network access points each having wired interfaces to communicate with the network controller and at least a first wireless interface to communicate with wireless stations according to a first wireless protocol and at least a second wireless interface to communicate with the end devices according to a second wireless protocol, wherein the network access points convert traffic according to the first wireless protocol and traffic according to the second wireless protocol to the first network protocol; and
   the network access points transmitting the converted traffic to the network controller, wherein the second wireless protocol comprises an IEEE 802.15-compliant personal area network protocol, and wherein channel selection for communication with the network access points according to the second wireless protocol is performed independently for each network access point.

2. The wireless network of claim 1 wherein the first network protocol comprises TCP/IP.

3. The wireless network of claim 1 wherein the first wireless protocol comprises an IEEE 802.11-compliant wireless protocol.

4. The wireless network of claim 1 wherein physical layer transport functionality for traffic according to the second wireless protocol is performed according to the first network protocol.

5. The wireless network of claim 1 wherein non-end device traffic for the plurality of network access points is transmitted according to the first network protocol over one or more wired connections.

6. A non-transitory computer-readable medium having stored thereon instructions that, when executed by one or more processors, are configurable to cause the one or more processors to:
   receive, from a remote end device, a scan request to join a network pursuant to the remote end device scanning for network access points;
   transmit, to the remote end device, a response comprising an identification of at least one network within a connection range to the remote end device;
   upon receipt of a confirmation from the remote end device, establish a wireless interface with the network, between the remote end device and one network access point of the network access points, comprising the identification chosen by the remote end device;

receive, via a first wireless interface and according to a first communications protocol, data from the remote end device, the first communications protocol comprising an IEEE 802.15-compliant personal area network protocol;

receive, via a second wireless interface and according to a second communications protocol, data from a remote client device;

translate at least a portion of the data from the remote end device to a data format according to the first network protocol;

transmit, via a wired interface and according to the first network protocol, the translated data to a network coordinator entity;

wherein channel selection for communication with the network access points according to the first communications protocol is performed independently for each network access point.

7. The non-transitory computer-readable medium of claim 6 wherein the first network protocol comprises TCP/IP.

8. The non-transitory computer-readable medium of claim 6 wherein physical layer transport functionality for traffic according to the first wireless protocol is performed according to the first network protocol.

9. The non-transitory computer-readable medium of claim 6 wherein the second communications protocol comprises an IEEE 802.11-compliant wireless protocol.

10. The non-transitory computer-readable medium of claim 6 wherein non-end device traffic for the network access points is transmitted according to the first network protocol over one or more wired connections.

11. A method comprising:
receiving, from a remote end device, a scan request to join a network pursuant to the remote end device scanning for network access points;

transmitting, to the remote end device, a response comprising an identification of at least one network within a connection range to the remote end device;

upon receipt of a confirmation from the remote end device, establishing a wireless interface with the network, between the remote end device and one network access point of the network access points, comprising the identification chosen by the remote end device;

receiving, via a first wireless interface and according to a first communications protocol, data from the remote end device, the first communications protocol comprising an IEEE 802.15-compliant personal area network protocol;

receiving, via a second wireless interface and according to a second communications protocol, data from a remote client device;

translating at least a portion of the data from the remote end device to a data format according to a first network protocol;

transmitting, via a wired interface and according to the first network protocol, the translated data to a network coordinator entity;

wherein channel selection for communication with the network access points according to the first communications protocol is performed independently for each network access point.

12. The method of claim 11 wherein physical layer transport functionality for traffic according to the first wireless protocol is performed according to the first network protocol.

13. The method of claim 11 wherein the second communications protocol comprises an IEEE 802.11-compliant wireless protocol.

14. The method of claim 11 wherein non-end device traffic for the network access points is transmitted according to the first network protocol over one or more wired connections.

* * * * *